United States Patent
Zhang et al.

(10) Patent No.: US 10,851,221 B2
(45) Date of Patent: Dec. 1, 2020

(54) CROSSLINKABLE POLYMERIC COMPOSITIONS WITH METHYL-RADICAL SCAVENGERS AND ARTICLES MADE THEREFROM

(71) Applicant: Dow Global Technologies LLC, Midland, MI (US)

(72) Inventors: Kainan Zhang, Shanghai (CN); Yabin Sun, Shanghai (CN); Jeffrey M. Cogen, Collegeville, PA (US); Timothy J. Person, Collegeville, PA (US); Jie Clive Ji, Shanghai (CN); Cuilan Chang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 246 days.

(21) Appl. No.: 16/089,170

(22) PCT Filed: Sep. 28, 2016

(86) PCT No.: PCT/CN2016/100517
§ 371 (c)(1),
(2) Date: Sep. 27, 2018

(87) PCT Pub. No.: WO2017/166762
PCT Pub. Date: Oct. 5, 2017

(65) Prior Publication Data
US 2020/0299483 A1   Sep. 24, 2020

(30) Foreign Application Priority Data

Mar. 30, 2016   (WO) ............... PCT/CN2016/077825

(51) Int. Cl.
*C08K 5/14* (2006.01)
*C08K 5/20* (2006.01)
(Continued)

(52) U.S. Cl.
CPC ............... *C08K 5/14* (2013.01); *C08K 5/20* (2013.01); *C08K 5/3432* (2013.01); *H01B 3/441* (2013.01); *H01B 9/027* (2013.01)

(58) Field of Classification Search
CPC .......... C08K 5/14; C08K 5/20; C08K 5/3432; H01B 3/441; H01B 9/027
(Continued)

(56) References Cited

U.S. PATENT DOCUMENTS

| 4,018,852 A | 4/1977 | Schober |
| 4,857,600 A | 8/1989 | Gross et al. |

(Continued)

FOREIGN PATENT DOCUMENTS

| WO | 02/28950 A2 | 4/2002 |
| WO | 2005/063896 A2 | 7/2005 |
| WO | 2008/112690 A2 | 9/2008 |

*Primary Examiner* — Timothy J Thompson
*Assistant Examiner* — Michael F McAllister
(74) *Attorney, Agent, or Firm* — Quarles & Brady LLP

(57) ABSTRACT

Crosslinkable polymeric compositions for use in, for instance, cable insulation layers, comprise an ethylene-based polymer, an organic peroxide, a crosslinking coagent, and a methyl-radical scavenger comprising at least one derivative of 2, 2, 6, 6-tetramethyl-1-piperidinyloxyl ("TEMPO"), wherein ratio of crosslinking coagent to organic peroxide is less than 1.72:1 on a molar basis. A crosslinked article prepared from a crosslinkable polymeric composition is also disclosed, the crosslinkable polymeric composition comprising, inter alia, a methyl-radical scavenger comprising at least one TEMPO derivative. In addition, a coated conducttor comprising a conductive core and a polymeric layer at least partially surrounding the conductive core is disclosed, wherein at least a portion of the polymeric layer comprises the crosslinked article.

10 Claims, 1 Drawing Sheet

(51) Int. Cl.
*C08K 5/3432* (2006.01)
*H01B 9/02* (2006.01)
*H01B 3/44* (2006.01)

(58) Field of Classification Search
USPC .................................................. 174/102 SC
See application file for complete search history.

(56) References Cited

U.S. PATENT DOCUMENTS

| | | |
|---|---|---|
| 5,346,961 A | 9/1994 | Shaw et al. |
| 5,575,965 A | 11/1996 | Caronia et al. |
| 5,962,592 A * | 10/1999 | Hess .................. C08F 8/30 |
| | | 525/232 |
| 7,465,769 B2 | 12/2008 | Esseghir et al. |
| 7,829,634 B2 | 11/2010 | Debaud et al. |
| 7,842,759 B2 * | 11/2010 | Esseghir .................. C08F 4/00 |
| | | 525/375 |
| 8,991,039 B2 * | 3/2015 | Esseghir ........... B29C 45/14467 |
| | | 29/830 |
| 10,513,625 B2 * | 12/2019 | Sun ...................... C08K 5/0025 |
| 2010/0016515 A1 | 1/2010 | Chaudhary et al. |
| 2010/0101823 A1 * | 4/2010 | Eaton ...................... H01B 3/18 |
| | | 174/110 SR |
| 2010/0174014 A1 | 7/2010 | Eaton |
| 2015/0030852 A1 * | 1/2015 | Jan ........................ H01B 3/441 |
| | | 428/379 |
| 2015/0267036 A1 | 9/2015 | Cree et al. |
| 2017/0009060 A1 | 1/2017 | Sun et al. |

\* cited by examiner

CROSSLINKABLE POLYMERIC COMPOSITIONS WITH METHYL-RADICAL SCAVENGERS AND ARTICLES MADE THEREFROM

TECHNICAL FIELD

The present disclosure relates to crosslinkable polymeric compositions comprising an ethylene-based polymer, an organic peroxide, a crosslinking coagent, and a methyl-radical scavenger comprising at least one derivative of 2,2,6,6-tetramethyl-1-piperidinyloxyl ("TEMPO"), and articles made therefrom.

BACKGROUND

Medium voltage ("MV"), high voltage ("HV"), and extra-high voltage ("EHV") cables typically contain a crosslinked polymeric material as an insulation layer, such as a crosslinked polyethylene. Such crosslinked polymeric materials can be prepared from a crosslinkable polymeric composition having a peroxide initiator. Crosslinking provides valuable improvements in the thermomechanical properties of the crosslinked polymeric material.

The peroxide initiators used for crosslinking do, however, create byproducts that require removal from the crosslinked polymeric material. For instance, when dicumyl peroxide is used as the peroxide initiator, the crosslinking reactions yield volatile byproducts such as acetophenone, cumyl alcohol, and methane. If not removed, these byproducts can negatively impact the quality of the cable comprising the crosslinked polymeric material. Byproduct removal must occur after the crosslinked polymeric material is formed into an insulation layer (e.g., by degassing) but before a jacketing layer is placed over the insulation layer.

Further, premature crosslinking, commonly known as "scorch," can be encountered during extrusion of the crosslinked polymeric material. Better scorch protection increases the processability of the crosslinked polymeric material.

Although advances have been achieved in the field of crosslinkable polymeric compositions, improvements are still desired.

SUMMARY OF THE DISCLOSURE

Crosslinkable polymeric compositions for use in, for example, cable insulation layers, are disclosed. The crosslinkable polymeric compositions comprise, inter alia, an ethylene-based polymer, an organic peroxide, a crosslinking coagent, and a methyl-radical scavenger comprising at least one TEMPO derivative, wherein the ratio of crosslinking coagent to organic peroxide is less than 1.72:1 on a molar basis. Inclusion of the at least one TEMPO derivative in the crosslinkable polymeric compositions provides a composition having improved properties, such as reduced byproduct offgassing, increased crosslink density, and improved scorch protection.

Crosslinked polymeric articles prepared from crosslinkable polymeric compositions are also disclosed, the crosslinkable polymeric compositions comprising, inter alia, a methyl-radical scavenger comprising at least one TEMPO derivative and a crosslinking coagent to organic peroxide ratio less than 1.72:1 on a molar basis. In addition, coated conductors comprising a conductive core and a polymeric layer at least partially surrounding the conductive core are disclosed, wherein at least a portion of the polymeric layer comprises the crosslinked polymeric articles.

BRIEF DESCRIPTION OF THE DRAWING

The sole FIGURE is a plot of peak area versus methane used as a calibration curve for methane quantification.

DETAILED DESCRIPTION OF THE DISCLOSURE

Crosslinkable Polymeric Composition

Figure 1:
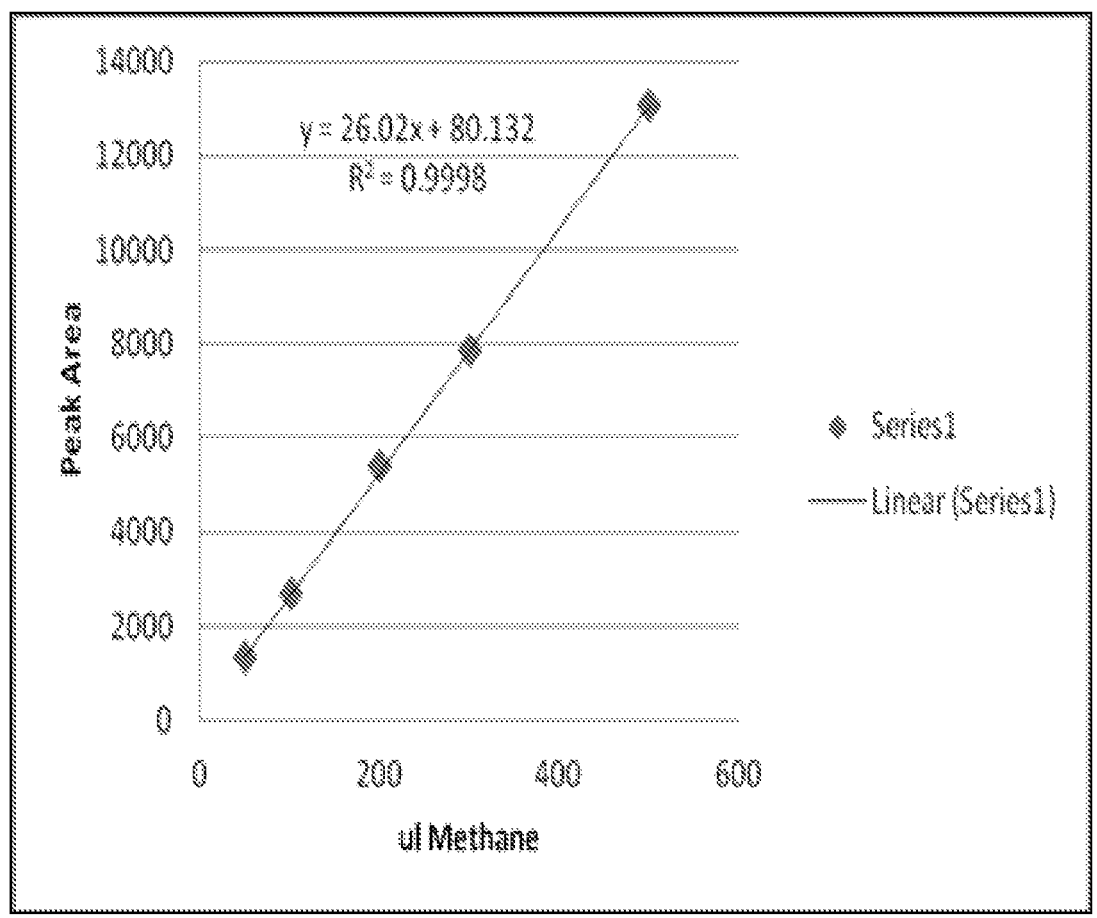

One component of the crosslinkable polymeric compositions described herein is an ethylene-based polymer. As used herein, "ethylene-based" polymers are polymers prepared from ethylene monomers as the primary (i.e., greater than 50 weight percent ("wt %")) monomer component, though other comonomers may also be employed. "Polymer" means a macromolecular compound prepared by reacting (i.e., polymerizing) monomers of the same or different type, and includes homopolymers and interpolymers. "Homopolymer" means a polymer consisting of repeating units derived from a single monomer type, but does not exclude residual amounts of other components used in preparing the homopolymer, such as chain transfer agents. "Interpolymer" means a polymer prepared by the polymerization of at least two different monomer types. The generic term "interpolymer" includes copolymers, usually employed to refer to polymers prepared from two different monomer types, and polymers prepared from more than two different monomer types (e.g., terpolymers, quaterpolymers, and so on).

In some embodiments, the ethylene-based polymer can be an ethylene homopolymer. In some embodiments, the ethylene-based polymer can be an ethylene/alpha-olefin ("α-olefin") interpolymer having an α-olefin content of at least 1 wt %, at least 5 wt %, at least 10 wt %, at least 15 wt %, at least 20 wt %, or at least 25 wt % based on the entire interpolymer weight. These interpolymers can have an α-olefin content of less than 50 wt %, less than 45 wt %, less than 40 wt %, or less than 35 wt % based on the entire interpolymer weight. When an α-olefin is employed, the α-olefin can be a $C_{3-20}$ (i.e., having 3 to 20 carbon atoms) linear, branched, or cyclic α-olefin. Examples of $C_{3-20}$ α-olefins include propene, 1-butene, 4-methyl-1-pentene, 1-hexene, 1-octene, 1-decease, 1-dodecene, 1-tetradecene, 1-hexadecene, and 1-octadecene. The α-olefins can also have a cyclic structure such as cyclohexane or cyclopentane, resulting in an α-olefin such as 3-cyclohexyl-1-propene (allyl cyclohexane) and vinyl cyclohexane. Illustrative ethylene/α-olefin interpolymers include ethylene/propylene, ethylene/1-butene, ethylene/1-hexene, ethylene/1-octene, ethylene/propylene/1-octene, ethylene/propylene/1-butene, and ethylene/1-butene/1-octene.

In some embodiments, the ethylene-based polymer can be used alone or in combination with one or more other types of ethylene-based polymers (e.g., a blend of two or more ethylene-based polymers that differ from one another by monomer composition and content, catalytic method of preparation, etc.). If a blend of ethylene-based polymers is employed, the polymers can be blended by any in-reactor or post-reactor process.

In some embodiments, the ethylene-based polymer can be selected from the group consisting of low-density polyethylene ("LDPE"), linear-low-density polyethylene ("LLDPE"), very-low-density polyethylene ("VLDPE"), and combinations of two or more thereof.

In some embodiments, the ethylene-based polymer can be a LDPE. LDPEs are generally highly branched ethylene homopolymers, and can be prepared via high pressure processes (i.e., HP-LDPE). LDPEs suitable for use herein can have a density ranging from 0.91 to 0.94 g/cm$^3$. In some embodiments, the ethylene-based polymer is a high-pressure LDPE having a density of at least 0.915 g/cm$^3$, but less than 0.94 g/cm$^3$, or less than 0.93 g/cm$^3$. Polymer densities provided herein are determined according to ASTM International ("ASTM") method D792. LDPEs suitable for use herein can have a melt index (I$_2$) of less than 40 g/10 min., or ranging from 0.1 to 40 g/10 min., or from 0.5 to 20 g/10 min., or from 0.5 to 5 g/10 min., or from 1 to 3 g/10 min., or an I$_2$ of 2 g/10 min. Melt indices provided herein are determined according to ASTM method D1238. Unless otherwise noted, melt indices are determined at 190° C. and 2.16 Kg (i.e., I$_2$). Generally, LDPEs have a broad molecular weight distribution ("MWD") resulting in a relatively high polydispersity index ("PDI;" ratio of weight-average molecular weight to number-average molecular weight).

In some embodiments, the ethylene-based polymer can be a LLDPE. LLDPEs are generally ethylene-based polymers having a heterogeneous distribution of comonomer (e.g., α-olefin monomer), and are characterized by short-chain branching. For example, LLDPEs can be copolymers of ethylene and α-olefin monomers, such as those described above. LLDPEs suitable for use herein can have a density ranging from 0.916 to 0.925 g/cm$^3$. LLDPEs suitable for use herein can have a melt index (I$_2$) ranging from 0.1 to 40 g/10 min., 1 to 20 g/10 min., or from 3 to 8 g/10 min.

In some embodiments, the ethylene-based polymer can be a VLDPE. VLDPEs may also be known in the art as ultra-low-density polyethylenes ("ULDPE"). VLDPEs are generally ethylene-based polymers having a heterogeneous distribution of comonomer (e.g., α-olefin monomer), and are characterized by short-chain branching. For example, VLDPEs can be copolymers of ethylene and α-olefin monomers, such as one or more of those α-olefin monomers described above. VLDPEs suitable for use herein can have a density ranging from 0.87 to 0.915 g/cm$^3$. VLDPEs suitable for use herein can have a melt index (I$_2$) ranging from 0.1 to 40 g/10 min., 0.1 to 20 g/10 min, or from 0.3 to 5 g/10 min.

In addition to the foregoing, the ethylene-based polymer can contain one or more polar comonomers, such as acrylates or vinyl acetates. Additionally, blends of non-polar ethylene-based polymers, such as those described above, and polar copolymers (e.g., those copolymers containing one or more types of polar comonomers), may also be employed. Furthermore, polyolefin elastomers, such as those commercially available under the trade name ENGAGE™ from The Dow Chemical Company, may be used as the ethylene-based polymer or in combination with one or more of the above-described ethylene-based polymers. Polyolefin elastomers suitable for use herein can have a density ranging from 0.857 g/cm$^3$ to 0.908 g/cm$^3$. Polyolefin elastomers suitable for use herein can have a melt index (I$_2$) ranging from 0.1 to 30 g/10 min., or from 0.5 to 5 g/10 min.

In some embodiments, the ethylene-based polymer can comprise a combination of any two or more of the above-described ethylene-based polymers.

Production processes used for preparing ethylene-based polymers are wide, varied, and known in the art. Any conventional or hereafter discovered production process for producing ethylene-based polymers having the properties described above may be employed for preparing the ethylene-based polymers described herein. In general, polymerization can be accomplished at conditions known in the art for Ziegler-Natta, chromium oxide, or Kaminsky-Sinn type polymerization reactions, that is, at temperatures from 0 to 250° C., or 30 or 200° C., and pressures from atmospheric to 10,000 atmospheres (approximately 1,013 MegaPascals ("MPa")). In most polymerization reactions, the molar ratio of catalyst to polymerizable compounds employed is from $10^{-12}$:1 to $10^{-1}$:1, or from $10^{-9}$:1 to $10^{-5}$:1.

An example of an ethylene-based polymer suitable for use herein is low-density polyethylene having a density of 0.92 g/cm$^3$ and a melt index (I$_2$) of 2 g/10 min.

The crosslinkable polymeric composition further comprises an organic peroxide. As used herein, "organic peroxide" denotes a peroxide having the structure: $R^1$—O—O—$R^2$ or $R^1$—O—O—R—O—O—$R^2$, where each of $R^1$ and $R^2$ is a hydrocarbyl moiety, and R is a hydrocarbylene moiety. As used herein, "hydrocarbyl" denotes a univalent group formed by removing a hydrogen atom from a hydrocarbon (e.g., ethyl, phenyl) optionally having one or more heteroatoms. As used herein, "hydrocarbylene" denotes a bivalent group formed by removing two hydrogen atoms from a hydrocarbon optionally having one or more heteroatoms. The organic peroxide can be any dialkyl, diaryl, dialkaryl, or diaralkyl peroxide, having the same or differing alkyl, aryl, alkaryl, or aralkyl moieties. In some embodiments, each of $R^1$ and $R^2$ is independently a $C_1$ to $C_{20}$ or $C_1$ to $C_{12}$ alkyl, aryl, alkaryl, or aralkyl moiety. In some embodiments, R can be a $C_1$ to $C_{20}$ or $C_1$ to $C_{12}$ alkylene, arylene, alkarylene, or aralkylene moiety. In some embodiments, R, $R^1$, and $R^2$ can have the same or a different number of carbon atoms and structure, or any two of R, $R^1$, and $R^2$ can have the same number of carbon atoms while the third has a different number of carbon atoms and structure.

Organic peroxides suitable for use herein include mono-functional peroxides and di-functional peroxides. As used herein, "mono-functional peroxides" denote peroxides having a single pair of covalently bonded oxygen atoms (e.g., having a structure R—O—O—R). As used herein, "di-functional peroxides" denote peroxides having two pairs of covalently bonded oxygen atoms (e.g., having a structure R—O—O—R—O—O—R). In some embodiments, the organic peroxide is a mono-functional peroxide.

Exemplary organic peroxides include dicumyl peroxide ("DCP"), tert-butyl peroxybenzoate, di-tert-amyl peroxide ("DTAP"), bis(alpha-t-butyl-peroxyisopropyl) benzene ("BIPB"), isopropylcumyl t-butyl peroxide, t-butylcumylperoxide, di-t-butyl peroxide, 2,5-bis(t-butylperoxy)-2,5-dimethylhexane, 2,5-bis(t-butylperoxy)-2,5-dimethylhexyne-3, 1,1-bis(t-butylperoxy)-3,3,5-trimethylcyclohexane, isopropylcumyl cumylperoxide, butyl 4,4-di(tert-butylperoxy) valerate, di(isopropylcumyl) peroxide, and combinations of two or more thereof. In some embodiments, only a single type of organic peroxide is employed. In some embodiments, the organic peroxide is dicumyl peroxide.

The crosslinkable polymeric composition further comprises a crosslinking coagent. Examples of crosslinking coagents include polyallyl crosslinking coagents such as triallyl isocyanurate ("TAIC"), triallyl cyanurate ("TAC"), triallyl trimellitate ("TATM"), N2,N2,N4,N4,N6,N6-hexaallyl-1,3,5-triazine-2,4,6-triamine ("HATATA"), triallyl orthoformate, pentaerythritol triallyl ether, triallyl citrate, and triallyl aconitate, α-methyl styrene dimer ("AMSD"), acrylate-based coagents such as trimethylolpropane triacrylate ("TMPTA"), trimethylolpropane trimethylacrylate ("TMPTMA"), ethoxylated bisphenol A dimethacrylate, 1,6-hexanediol diacrylate, pentaerythritol tetraacrylate, dipentaerythritol pentaacrylate, tris(2-hydroxyethyl) isocyanurate triacrylate, and propoxylated glyceryl triacrylate, vinyl-based coagents such as polybutadiene having a high 1,2-vinyl content, trivinyl cyclohexane ("TVCH"), and other coagents such as those described in U.S. Pat. Nos. 5,346,961 and 4,018,852. The crosslinking coagent may comprise a single coagent or a blend of coagents (i.e., a combination of two or more coagents).

The crosslinkable polymeric composition further comprises a methyl-radical scavenger comprising at least one derivative of 2,2,6,6-tetramethyl-1-piperidinyloxyl ("TEMPO") having a structure of formula (I)

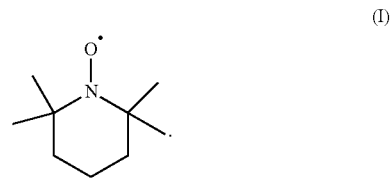

As used herein, derivatives of TEMPO include, but are not limited to, 4-acryloxy-2,2,6,6-tetramethylpiperidine-N-oxyl ("acrylate TEMPO") having a structure of formula (II) (CAS: 21270-85-9)

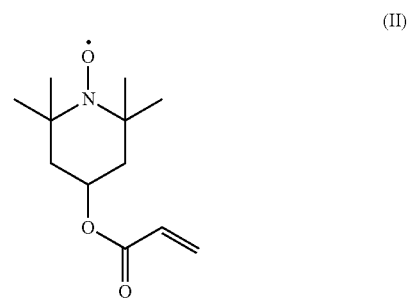 [SMILES: C=CC(=O)OC1CC(C)(C)N(O)C(C)(C)C1]

4-allyloxy-2,2,6,6-tetramethylpiperidine-N-oxyl ("allyl TEMPO") having a structure of formula (III), (CAS: 217496-13-4)

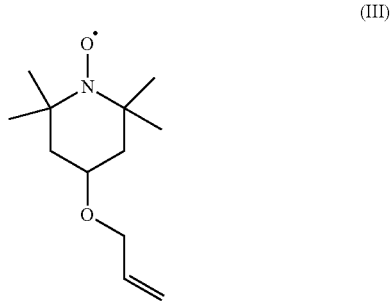

bis(2,2,6,6-tetramethyl-1-piperidinyloxy-4-yl) sebacate ("bis TEMPO") having a structure of formula (IV), (CAS: 2516-92-9)

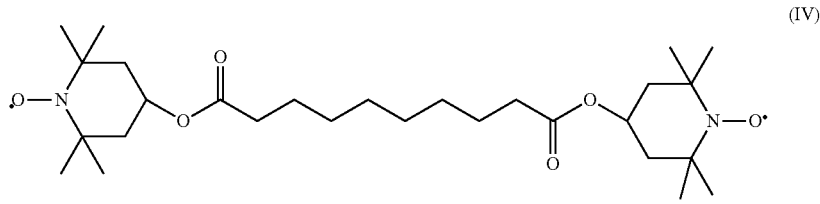 [SMILES: CC1(C)CC(OC(=O)CCCCCCCCC(=O)OC2CC(C)(C)N(O)C(C)(C)C2)CC(C)(C)N1O]

N,N-bis(acryloyl-4-amino)-2,2,6,6-tetramethylpiperidine-1-oxyl (diacrylamide TEMPO) having a structure of formula V (CAS #1692896-32-4):

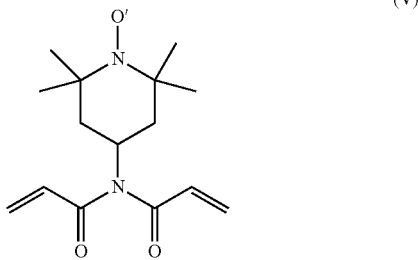

(V)

N-acryloyl-4-amino-2,2,6,6-tetramethylpiperidine-1-oxyl (monoacrylamide TEMPO) of the structure of formula VI (CAS #21270-88-2):

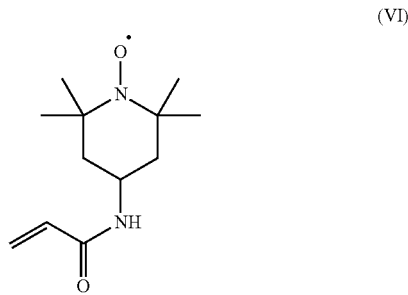 [SMILES: C=CC(=O)NC1CC(C)(C)N(O)C(C)(C)C1]

(VI)

$N^1,N^3,N^5$-triacryloyl-$N^1,N^3,N^5$-tris(2,2,6,6-tetramethyl-1-($\lambda^1$-oxidanyl)piperidin-4-yl)benzene-1,3,5-tricarboxamide (triacryltriTEMPO) of the structure of formula VII:

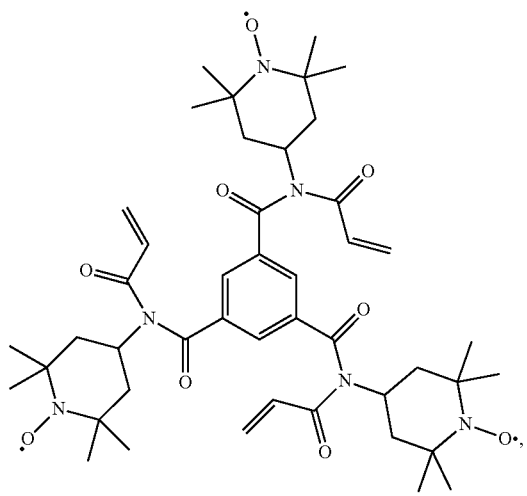

(VII)

and combinations of two or more thereof. The methyl-radical scavenger can comprise a TEMPO derivative selected from any one of these TEMPO compounds, e.g., acrylate, allyl, monoacrylamide, diacrylamide, bis, triacryl-tri, and combinations of two or more thereof.

In some embodiments, the crosslinkable polymeric composition can comprise the ethylene-based polymer in an amount ranging from 1 to 99.9 wt %, from 90 to 99.9 wt %, or from 97.72 to 98.6 wt %, based on the entire crosslinkable polymeric composition weight. In addition, the crosslinkable polymeric composition can comprise the organic peroxide in an amount ranging from 0.1 to 3 wt %, from 0.1 to 2 wt %, or from 0.1 to 0.95 wt %, based on the entire crosslinkable polymeric composition weight. Further, the crosslinkable polymeric composition can comprise the crosslinking coagent in an amount ranging from 0.1 to 5.2 wt %, from 0.2 to 1 wt %, or from 0.4 to 0.5 wt %, based on the entire crosslinkable polymeric composition weight. Still further, the crosslinkable polymeric composition can comprise the methyl-radical scavenger in an amount ranging from 0.05 to 10 wt %, from 0.16 to 5 wt %, from 0.5 to 1 wt %, or from 0.68 to 0.72 wt %, based on the entire crosslinkable polymeric composition weight. In some embodiments, the ratio of crosslinking coagent and organic peroxide is equal to or less than 1.72:1 on a molar basis (i.e., moles crosslinking coagent/moles organic peroxide), equal to or less than 1.08:1 on a molar basis, or equal to or less than 0.51:1 on a molar basis.

In addition to the components described above, the crosslinkable polymeric composition may also contain one or more additives including, but not limited to, scorch retardants, antioxidants, processing aids, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, flame retardants, water tree retardants, electrical tree retardants, voltage stabilizers, and metal deactivators. Additives, other than fillers, are typically used in amounts ranging from 0.01 or less to 10 or more wt % based on total composition weight. Fillers are generally added in larger amounts, although the amount can range from as low as 0.01 or less to 65 or more wt % based on the total composition weight. Illustrative examples of fillers include clays, precipitated silica and silicates, fumed silica, calcium carbonate, ground minerals, aluminum trihydroxide, magnesium hydroxide, and carbon blacks with typical arithmetic mean particle sizes larger than 15 nanometers.

Further, exemplary antioxidants include hindered phenols (e.g., tetrakis[methylene (3,5-di-t-butyl-4-hydroxyhydrocinnamate)] methane), less-hindered phenols, and semi-hindered phenols, phosphates, phosphites, and phosphorites (e.g., tris (2,4-di-t-butylphenyl) phosphate), thio compounds (e.g., distearyl thiodipropionate, dilauryl thiodipropionate), various siloxanes, and various amines (e.g., polymerized 2,2,4-trimethyl-1,2-dihydroquinoline). In some embodiments, the antioxidant is selected from the group consisting of distearyl thiodipropionate, dilauryl thiodipropionate, octadecyl-3,5-di-t-butyl-4-hydroxyhydrocinnamate, benzenepropanoic acid, 3,5-bis(1,1-dimethylethyl)-4-hydroxy-thiodi-2,1-ethanediyl ester, stearyl 3-(3,5-di-t-butyl-4-hydroxyphenyl) propionate, octadecyl-3-(3,5-di-tert-butyl-4-hydroxyphenyl)-propionate, 2,4-bis(dodecylthiomethyl)-6-methylphenol, 4,4'-thiobis(6-tert-butyl-m-cresol), 4,6-bis(octylthiomethyl)-o-cresol, 1,3,5-tris(4-tert-butyl-3-hydroxy-2,6-dimethyl benzyl)-1,3,5-triazine-2,4,6-(1H,3H,5H)-trione, pentaerythritol tetrakis(3-(3,5-di-t-butyl-4-hydroxyphenyl)propionate), 2',3-bis[[3-[3,5-di-tert-butyl-4-hydroxyphenyl] propionyl]] propionohydrazide, and combinations of two or more thereof. Commercially available examples of antioxidants suitable for use in the disclosed crosslinkable polymeric materials include CYANOX™ 1790 available from the Cytec Solvay Group and IRGANOX™ PS 802 available from BASF SE. Suitable antioxidants may also comprise hindered amine light stabilizers ("HALS").

Antioxidants, when present, can be used in amounts ranging from 0.001 to 5 wt %, from 0.01 to 1 wt %, from 0.1 to 5 wt %, from 0.1 to 1 wt %, or from 0.1 to 0.5 wt %, based on the total weight of the crosslinkable polymeric composition.

Preparation of Crosslinkable Polymeric Composition

Preparation of the cross-linkable polymeric composition can comprise compounding the above-described components. For example, compounding can be performed by either (1) compounding all components into the ethylene-based polymer, or (2) compounding all the components except for one or more of the organic peroxide, one or more of crosslinking coagent, and one or more of methyl-radical scavenger, which can be soaked in as described below. Compounding of the crosslinkable polymeric composition can be effected by standard equipment known to those skilled in the art. Examples of compounding equipment are internal batch mixers, such as a Brabender™, Banbury™, or Bolling™ mixer. Alternatively, continuous single or twin screw, mixers can be used, such as a Farrel™ continuous mixer, a Werner and Pfleiderer™ twin screw mixer, or a Buss™ kneading continuous extruder. Compounding can be performed at a temperature of greater than the melting temperature of the ethylene-based polymer up to a temperature above which the ethylene-based polymer begins to degrade. In some embodiments, compounding can be performed at a temperature ranging from 100 to 200° C., or from 110 to 150° C.

In some embodiments, the ethylene-based polymer and any optional components can first be melt compounded according to the above-described procedure and pelletized. Next, the organic peroxide, the crosslinking coagent, and the methyl-radical scavenger comprising at least one TEMPO derivative can be soaked into the resulting ethylene-based polymer compound, either simultaneously or sequentially. In some embodiments, one or more of the organic peroxide, the coagent, and the TEMPO derivative can be premixed at the temperature above the melting temperature of the organic peroxide, the coagent, and the TEMPO derivative, whichever is greatest or above the melt temperature of the corresponding mixture, followed by soaking the ethylene-based polymer compound in the resulting mixture of the organic peroxide, the crosslinking coagent, and the TEMPO derivative at a temperature ranging from 30 to 100° C., from 50 to 90° C., or from 60 to 80° C., for a period of time ranging from 1 to 168 hours, from 1 to 24 hours, or from 3 to 12 hours.

The resulting crosslinkable polymeric composition can have certain enhanced properties. Though not wishing to be bound by theory, it is believed that utilizing a disclosed crosslinking coagent together with a methyl-radical scavenger comprising at least one TEMPO derivative can surprisingly provide superior curing and scorch resistance properties as well as decreased undesired byproduct generation.

Crosslinked Polymeric Composition

The above-described crosslinkable polymeric compositions can be cured or allowed to cure in order to form a crosslinked polymeric composition. Such curing can be performed by subjecting the crosslinkable polymeric composition to elevated temperatures in a heated cure zone, which can be maintained at a temperature in the range of 175 to 260° C. The heated cure zone can be heated by pressurized steam or inductively heated by pressurized nitrogen gas. Thereafter, the crosslinked polymeric composition can be cooled (e.g., to ambient temperature).

The crosslinking process can create volatile decomposition byproducts in the crosslinked polymeric composition. Following crosslinking, the crosslinked polymeric composition can undergo degassing to remove at least a portion of the volatile decomposition byproducts. Degassing can be performed at a degassing temperature, a degassing pressure, and for a degassing time period to produce a degassed polymeric composition. In some embodiments, the degassing temperature can range from 50 to 150° C., or from 60 to 80° C. In some embodiments, the degassing temperature is 65 to 75° C. Degassing can be conducted under standard atmosphere pressure.

Cable Core

The initial cable core containing inner and outer semiconductive and insulation layers can be prepared with various types of extruders, e.g., single or twin screw types. A description of a conventional extruder can be found in U.S. Pat. No. 4,857,600. An example of co-extrusion and an extruder therefore can be found in U.S. Pat. No. 5,575,965. A typical extruder has a hopper at its upstream end and a die at its downstream end. The hopper feeds into a barrel, which contains a screw. At the downstream end, between the end of the screw and the die, there is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1.

Following extrusion, the resulting initial cable core can undergo a crosslinking process to crosslink the insulation and both inner and outer semiconductive layers. For example, the initial cable core can be passed into a heated cure zone downstream of the extrusion die. The heated cure zone can be maintained at a temperature in the range of about 150 to about 350° C., or in the range of about 170 to about 250° C. The heated cure zone can be heated by pressurized steam, or inductively heated pressurized nitrogen gas. Following the crosslinking process, the cable core having a crosslinked insulation, inner, and outer semiconductive layers can be cooled (e.g., to room temperature).

Degassing

The crosslinking process can create volatile decomposition byproducts in the crosslinked insulation layer. The term "volatile decomposition products" denotes decomposition products formed during the curing step, and possibly during the cooling step, by decomposition and reaction of the free radical generating agent (e.g., dicumyl peroxide). Such byproducts can comprise alkanes, such as methane. Additional byproducts can include alcohols. Such alcohols can comprise the alkyl, aryl, alkaryl, or aralkyl moieties of the above-described organic peroxide. For instance, if dicumyl peroxide is employed as a crosslinking agent, the byproduct alcohol is cumyl alcohol. Other decomposition products can include ketone byproducts from the above-described organic peroxide. For example, acetophenone is a decomposition byproduct of dicumyl peroxide.

Following crosslinking, the crosslinked insulation layer can undergo degassing to remove at least a portion of volatile decomposition byproducts. Degassing can be performed at a degassing temperature, a degassing pressure, and for a degassing time period to produce a degassed cable core. In various embodiments, the degassing temperature can range from 50 to 150° C., or from 60 to 80° C. In an embodiment, the degassing temperature is 65 to 75° C. Degassing can be conducted under standard atmospheric pressure (i.e., 101,325 Pa).

Alternating current cables can be prepared according to the present disclosure, which can be LV, MV, HV, or EHV cables. Further, direct current cables can be prepared according to the present disclosure, which can include high or extra-high voltage cables.

EXAMPLES AND TESTING

Raw Materials

A low-density polyethylene ("LDPE") is employed that has a melt index ($I_2$) of approximately 2 g/10 min. and a density of 0.92 g/cm$^3$. LDPE 1 is produced by The Dow Chemical Company and contains 0.13% distearyl thiodipropionate ("DSTDP"), 0.09% CYANOX™ 1790 and about 20 ppm UVINUL 4050. LDPE 2 is produced by The Dow Chemical Company and contains 0.09% DSTDP, 0.06% CYANOX™ 1790 and about 14 ppm UVINUL 4050. LDPE 3 and LDPE 4 are prodiced by The Dow Chemical Company without any antioxidant.

CYANOX™ 1790 is a commercially available antioxidant having the chemical name 1,3,5-tris(4-tert-butyl-3-hydroxy-2,6-dimethylbenzyl)-1,3,5-triazine-2,4,6-trione, available from Cytec Industries. It is used as received.

Distearyl thiodipropionate ("DSTDP") is a commercially available antioxidant available from Cytec. It is used as received. UVINUL™ 4050 is a commercially available UV stabilizer having the chemical name 1,6-hexamethylenebis[N-formyl-N-(2,2,6,6-tetramethylpiperidin-4-yl)amine], available from BASF. It is used as received.

Dicumyl peroxide ("DCP") is commercially available from Shanghai Fangruida Chemicals Co., Ltd.

Triallyl isocyanurate ("TAIC") is commercially available from Shanghai Fangruida Chemicals Co., Ltd. It is used as received.

Triallyl cyanurate ("TAC") and triallyl trimellitate ("TATM") are commercially available from Sinopharm Chemical. Both are used as received.

TMPTA and TMPTMA are commercially available from Sartomer. Both are used as received.

HATATA is prepared by adding 3.69 g (0.02 mol) cyanuric acid and 8.90 g (0.064 mol) sodium carbonate into 30 g of 1,4-dioxane in a three-neck flask. While stirring, heat the mixture to 75° C., and stir for an additional 5 minutes upon reaching 75° C. Next, gradually add 10.22 g (0.1 mol) diallylamine dropwise over about 15 minutes, then add 2.8 g of sodium hydroxide (0.07 mol) and raise the temperature to about 90° C. Keep the reaction mixture at 90° C. for 5 hours. Thereafter, cool the reaction mixture to room temperature and filter using vacuum filtration with a sand-core funnel to remove insoluble salts. The resulting filtrate is distilled under reduced pressure to recover the solvent, and the residue is dissolved in petroleum ether and further purified through silica gel column. This is performed by first transferring the liquid filtrate from the flask to the silica gel column and use 2 mL of petroleum ether to wash the flask and transfer the solution to the silica gel. The silica gel is 300 mesh and is used as the stationary phase; the petroleum ether is used as the eluent.

TEMPO is commercially available from TCI. It is used as received.

Bis TEMPO is commercially available from Ningbo Sialon Chem. Co. Ltd. It is used as received.

Acrylate TEMPO can be prepared by known techniques, such as those disclosed in Hyslop D. K., Parent J. S., *Macromolecules*, 2012; 45, 8147-8154. For instance, acryloyl chloride (632 mg, 0.57 mL, 6.98 mmol) in toluene (2.03 mL) was added dropwise to a solution of 4-hydroxyl TEMPO (4-hydroxyl-2,2,6,6-tetramethyl-1-piperidinyloxy) (1 g, 5.81 mmol) and triethylamine (706 mg, 0.97 mL, 6.98 mmol) in toluene (14.4 mL), and the mixture was stirred at room temperature for 16 h. The resulting solution was filtered before removing solvent under vacuum, yielding orange crystals that were recrystallized from cyclohexane.

Allyl TEMPO can be prepared by adding 1.2 equivalents of sodium hydride to a solution of 1 equivalent of TEMPO in tetrahydrofuran. Allyl brodmide is added dropwise to the solution and the mixture is stirred at reflux for 12 hours. The mixture is then quenched by addition of saturated ammonium chloride and extracted with ethyl acetate. The combined organic layers are then washed with brine, dried over sodium sulfate, and concentrated under reduced pressure. The crude material is purified by flash column chromatography to obtain the allyl TEMPO.

Moving Die Rheometer

Perform moving die rheometer ("MDR") testing at 180° C. and 140° C. according to the methods described in ASTM D5289 on an Alpha Technologies MDR 2000 using samples cut from the sheet prepared by the two-roll mill or soaked pellets.

Scorch Improvement

Scorch Improvement of a sample X prepared with both crosslinking coagent and a methyl-radical scavenger is calculated using equation (I) below:

$$SI=ts1@140°\ C.-ts1'@140°\ C. \tag{I}$$

where SI is the scorch improvement, ts1@140° C. is the scorch time of sample X measured by MDR at 140° C., and ts1'@140° C. is the predicted scorch for sample X but having no methyl-radical scavenger and no crosslinking coagents, where the prediction is based on the crosslink density (MH–ML) of sample X. The predicted scorch time is calculated according to equation (2) below:

$$ts1'@140°\ C.=-4.10+142.84/(MH-ML)@180°\ C. \tag{II}$$

where:

(MH–ML)@180° C. is the crosslink density of sample X measured by MDR at 180° C. Equation (I) is determined based on comparison of five samples prepared without a methyl-radical scavenger and crosslinking coagents to determine the relationship between scorch time and crosslink density for samples having no crosslinking coagent and no methyl-radical scavenger.

TABLE 1

Curing/scorch results at different DCP loading

| LDPE 1, % | DCP, % | ts1 @ 140° C., min. | MH-ML @ 180° C., dN * m |
|---|---|---|---|
| 99.4 | 0.6 | 130.00 | 1.05 |
| 99.1 | 0.9 | 80.46 | 1.81 |
| 98.8 | 1.2 | 50.66 | 2.52 |
| 98.5 | 1.5 | 38.80 | 3.26 |
| 98.2 | 1.8 | 31.77 | 3.89 |

Equation (2) is the relationship between crosslink density (MH–ML)@180° C. and scorch time (ts1'@140° C.) of the sample containing no methyl-radical scavenger and no crosslinking coagents. Therefore, the scorch time (ts1'@140° C.) of the sample with no methyl-radical scavenger and no crosslinking coagents (ts1'@140° C.) at a given crosslink density (MH−ML)@180° C. can be predicted by this equation. The SI value suggests how the addition of both a crosslinking coagents and a methyl-radical scavenger will impact the scorch time compared to the sample without both the crosslinking coagent and methyl-radical scavenger. A negative value means reduced the anti-scorch property, while a positive value means improved anti-scorch property, with the greater the positive value the better.

Methane Content (Multiple Headspace Extraction Via Headspace Gas Chromatography)

Methane content is measured on plaque samples

Compression Molding to Prepare Plaques
1. Put about 30 g of sample into a 1-mm thickness mold between two PET films. Then put this loaded mold into a hot press machine (LabTech).
2. Preheating at 120° C. for 10 minutes.
3. Venting for 8 times and 0.2 s for each.
4. Close the platens to apply 15 MPa pressure to mold for 20 minutes. Meanwhile increase the temperature to 182° C. within 6.5 minutes.
5. Keep a continued 15 MPa on the mold and cooling to 24° C.
6. Take out the mold from machine.

Headspace Gas Chromatography (GC) Sampling
1. Remove the cured plaque with two PET films adhered on both sides from mold
2. Peel off the PET film quickly.
3. Cut out two sheets of the plaque's center area (0.3 g), and put them into two headspace GC vials, then seal the vials immediately. ~30 seconds from step 2 to 3
4. Weigh the sealed GC headspace vial, and the sample weight could be calculated by the difference between the empty vial and the vial with sample.

| GC Conditions for Plaque Analyses | |
|---|---|
| Instrumentation | |
| Gas chromatograph | Agilent 6890 |
| Injection port | Split/splitless |
| Column | DB-5MS, 30 m × 0.32 mm × 1.0 mm |
| Detector | FID |
| Sample introduction | G1888 |
| Data collection | ChemStation |
| G1888 Headspace Conditions | |
| GC cycle time | 30 minutes |
| Oven temperature | 150° C. |
| Loop temperature | 180° C. |
| Transfer line temperature | 190° C. |
| Vial equilibration time | 30 minutes |
| Shaking speed | Off |
| Loop fill time | 0.20 minutes |
| Loop equilibration time | 0.10 minutes |
| Inject time | 0.50 minutes |
| Pressurization time | 0.50 minutes |
| Advance functions | Multi HS EXT on; 5 extractions per vial |
| 6890 GC Conditions | |
| Carrier gas (EPC) | Nitrogen, 2.0 mL/min |
| Inlet temperature | 300° C. |
| Split ratio | 1:50 |
| Flow mode | Constant flow |
| Aux 5 | 15 psi |
| FID temperature | 300° C. |
| Oven Program | 50° C., hold for 3 min; ramp to 280° C. at a rate of 15° C./min; hold for 2 minutes. (20.3 min in all) |

| GC Conditions for Plaque Analyses | |
|---|---|
| Detector | FID @ 300° C.; Hydrogen 40 mL/min; Air 450 mL/min; Make up (Nitrogen) 45 mL/min |

Multiple Headspace Extraction

MHE assumes that all of the analyte will be extracted thoroughly from the sample after unlimited headspace extraction steps. The theoretical value of the total amount is calculated by the following formula:

$$\ln A_n = -K(n-1) + \ln A_1 \sum_{n=1}^{\infty} A_n = A_1/(1-e^{-K})$$

To calculate the total value by this formula, only two parameters are needed, $A_1$ and $K$. $A_1$ is the peak area or analyte amount of the first extraction. $K$ is the slope of a linear relationship predicted between the sequence number of extraction and the corresponding natural logarithm of peak area or analyte amount. If the sample is a suitable system for application of multiple headspace extraction, a good fit will be observed between extraction number and the logarithm of peak area. The methane concentration in plaque is calculated according calibration curve, correlation between peak area and methane concentration.

Calibration Curve 50, 100, 200, 300 and 500 uL pure methane gas is injected into a 20 mL headspace vial separately, and then these samples are analyzed by GC with the same GC condition. The calibration curve is provided in the FIG. 1

COMPARATIVE EXAMPLES ("CE") AND ILLUSTRATIVE EXAMPLES ("IE")

The effect of the coagent to peroxide ratio on the crosslinkable compositions is determined by preparing CEs and IEs according to the formulations provided in Table 2, below, and using the materials described above and the sample preparation methods below. Three Illustrative Samples (IE1-IE3) and three Comparative Samples (CE1-CE3) are prepared according to the formulations provided in Table 2 below by soaking DCP and TAIC, with or without acrylate TEMPO, into LDPE1 pellets at 80° C. for 8 hours.

TABLE 2

Formulations of CE1-CE3 and IE1-IE3

| Component | CE1 | IE1 | CE2 | IE2-1 | CE3 | IE3 |
|---|---|---|---|---|---|---|
| LDPE 1 | 98.5 | 98.34 | 98.6 | 98.44 | 98.45 | 98.29 |
| Organic Peroxide (DCP) | 0.75 | 0.75 | 0.95 | 0.95 | 0.60 | 0.60 |
| Coagent (TAIC) | 0.75 | 0.75 | 0.45 | 0.45 | 0.95 | 0.95 |
| Radical Scavenger (Acrylate TEMPO) | | 0.16 | | 0.16 | | 0.16 |
| Total | 100 | 100 | 100 | 100 | 100 | 100 |
| Coagent/Peroxide Ratio (mol/mol) | 1.08 | 1.08 | 0.51 | 0.51 | 1.72 | 1.72 |

Analyze CE1-CE3 and IE1-IE3 for curing behavior and methane production using the above-described Test Methods. The results are provided in Table 3 below.

TABLE 3

Properties of CE1-CE3 and IE1-IE3

| Properties | CE1 | IE1 | CE2 | IE2-1 | CE3 | IE3 |
|---|---|---|---|---|---|---|
| ML, dN * m | 0.22 | 0.20 | 0.22 | 0.19 | 0.22 | 0.18 |
| MH, dN * m | 3.71 | 3.55 | 3.82 | 3.63 | 3.26 | 3.32 |
| MH-ML, dN * m | 3.49 | 3.35 | 3.60 | 3.44 | 3.04 | 3.14 |
| ts1 @ 180° C., min. | 1.16 | 1.36 | 1.08 | 1.23 | 1.38 | 1.62 |
| T90 @ 180° C., min. | 4.27 | 4.52 | 4.16 | 4.30 | 4.80 | 5.163 |
| Methane, ppm | 301 | 273 | 385 | 336 | 205 | 209 |
| ΔMethane, ppm |  | −28 |  | −49 |  | 4 |

The results from Table 3 show that the addition of acrylate TEMPO to a composition comprising a crosslinking coagent, with a coagent to peroxide ratio of less than 1.72:1, provides for crosslinkable compositions exhibiting decreased methane production, comparable crosslink density, and improved scorch resistance. In particular, CE1 and IE1 each contain identical formulations except that IE1 includes acrylate TEMPO and reduced ethylene-based polymer in a corresponding amount. IE1 exhibits comparable crosslink density, improved scorch times, and a nearly 10 percent decrease in methane production. Likewise, CE2 and IE2-1 contain identical formulations except that IE2-1 includes acrylate TEMPO and reduced ethylene-based polymer in a corresponding amount. IE2-1 exhibits comparable crosslink density, improved scorch times, and a nearly 13 percent decrease in methane production. In the case of CE3 and IE3, an improved cure and scorch performance is realized with IE3, while the methane production is maintained.

CE2, CE4-CE8 and IE2-2, IE4-IE8

The effect of various coagents on the crosslinkable compositions is determined by preparing CEs and IEs according to the formulations provided in Table 4, below, and using the materials described above and the sample preparation methods below. Six Illustrative Samples (IE2-2, IE4-IE8) and six Comparative Samples (CE2, CE4-CE8) are prepared according to the formulations provided in Table 4 below by soaking DCP and coagents, with or without acrylate TEMPO, into LDPE1 pellets at 80° C. for 8 hours.

TABLE 4

Formulations of CE2, CE4-CE8 and IE2-2, IE4-IE8

| Component | CE2 | IE2-2 | CE4 | IE4 | CE5 | IE5 | CE6 | IE6 | CE7 | IE7 | CE8 | IE8 |
|---|---|---|---|---|---|---|---|---|---|---|---|---|
| LDPE1 | 98.60 | 97.88 | 98.44 | 97.72 | 98.44 | 97.72 | 98.60 | 97.88 | 98.72 | 98.00 | 98.45 | 97.73 |
| Organic Peroxide (DCP) | 0.95 | 0.95 | 0.95 | 0.95 | 0.95 | 0.95 | 0.95 | 0.95 | 0.95 | 0.95 | 0.95 | 0.95 |
| Coagent (TAIC) | 0.45 | 0.45 |  |  |  |  |  |  |  |  |  |  |
| Coagent (TMPTMA) |  |  |  |  | 0.61 | 0.61 |  |  |  |  |  |  |
| Coagent (TMPTA) |  |  | 0.61 | 0.61 |  |  |  |  |  |  |  |  |
| Coagent (TAC) |  |  |  |  |  |  | 0.45 | 0.45 |  |  |  |  |
| Coagent (HATATA) |  |  |  |  |  |  |  |  | 0.33 | 0.33 |  |  |
| Coagent (TATM) |  |  |  |  |  |  |  |  |  |  | 0.60 | 0.60 |
| Radical Scavenger (Acrylate TEMPO) |  | 0.72 |  | 0.72 |  | 0.72 |  | 0.72 |  | 0.72 |  | 0.72 |
| Total | 100 | 100 | 100 | 100 | 100 | 100 | 100 | 100 | 100 | 100 | 100 | 100 |
| Coagent/Peroxide Ratio (mol/mol) | 0.51 | 0.51 | 0.58 | 0.58 | 0.51 | 0.51 | 0.51 | 0.51 | 0.26 | 0.26 | 0.52 | 0.52 |

Analyze CE2, CE4-CE8 and IE2-2, IE4-IE8 for curing behavior and methane production using the above-described Test Methods. The results are provided in Table 5, below.

TABLE 5

Properties of CE2, CE4-CE8 and IE2-2, IE4-IE8

| Properties | CE2 | IE2-2 | CE4 | IE4 | CE5 | IE5 | CE6 | IE6 | CE7 | IE7 | CE8 | IE8 |
|---|---|---|---|---|---|---|---|---|---|---|---|---|
| ML, dN * m | 0.22 | 0.18 | 0.28 | 0.18 | 0.21 | 0.18 | 0.23 | 0.18 | 0.23 | 0.19 | 0.23 | 0.18 |
| HM, dH * m | 3.82 | 2.90 | 2.60 | 2.66 | 2.32 | 2.30 | 3.46 | 3.21 | 2.86 | 2.79 | 3.29 | 3.40 |
| MH-ML, dN * m | 3.60 | 2.72 | 2.32 | 2.48 | 2.11 | 2.12 | 3.23 | 3.03 | 2.63 | 2.60 | 3.06 | 3.22 |
| ts1 @ 180° C., min. | 1.08 | 2.27 | 1.54 | 1.87 | 2.00 | 2.49 | 1.12 | 2.10 | 1.34 | 2.09 | 1.19 | 1.89 |
| T90 @ 180° C., min | 4.16 | 5.91 | 4.69 | 5.39 | 5.12 | 5.67 | 4.23 | 5.77 | 4.31 | 5.26 | 4.41 | 5.57 |
| ts1 @ 140° C., min. | 41.91 | 109.68 | 54.37 | 97.01 | 63.00 | 99.71 | 42.32 | 96.02 | 50.50 | 79.05 | 44.69 | 80.51 |
| SI, min. |  | 6.33 | 61.26 | −3.10 | 43.51 | −0.60 | 36.42 | 2.20 | 52.97 | 0.29 | 28.21 | 2.11 | 40.25 |
| Methane, ppm | 385 | 208 | 382 | 225 | 388 | 222 | 386 | 235 | 358 | 218 | 370 | 231 |
| ΔMethane, ppm |  | −177 |  | −157 |  | −166 |  | −151 |  | −140 |  | −139 |

The results from Table 5 show that the addition of acrylate TEMPO to a composition comprising a crosslinking coagent, with a coagent to peroxide ratio of less than 1.72:1, provides for crosslinkable compositions exhibiting decreased methane production, comparable crosslink density, and improved scorch resistance. The IEs in Table 5 each comprise acrylate TEMPO whereas the CEs do not. The IEs exhibited comparable crosslink density, improved scorch times, and decreases in methane production.

CE2, CE9, IE2-2, IE9, and IE10

The effect of various TEMPO derivatives on the crosslinkable compositions is determined by preparing CEs and IEs according to the formulations provided in Table 6, below, and using the materials described above and the sample preparation methods below. Two Illustrative Samples (IE2-2 and IE9) and two Comparative Samples (CE2 and CE9) are prepared according to the formulations provided in Table 6 below by soaking DCP and TAIL, with or without TEMPO derivatives, into LDPE1 pellets at 80° C. for 8 hours. IE10 is prepared by first blending the LDPE 1 and bis TEMPO in a Brabender mixer at 125° C. and a rotor speed of 30 rpm. The resulting compound is extruded through a single-screw extruder at 125° C. and pelletized. Then DCP and TAIC are soaked into the pellets at 80° C. for 8 hours.

TABLE 6

Formulations of CE2, CE9, IE2-2, IE9, and IE10

| Component | CE2 | IE2-2 | IE9 | IE10 | CE9 |
|---|---|---|---|---|---|
| LDPE 1 | 98.60 | 97.88 | 97.92 | 97.88 | 98.10 |
| Organic Peroxide (DCP) | 0.95 | 0.95 | 0.95 | 0.95 | 0.95 |
| Coagent (TAIC) | 0.45 | 0.45 | 0.45 | 0.45 | 0.45 |
| TEMPO | | | | | 0.50 |
| Radical Scavenger (Acrylate TEMPO) | | 0.72 | | | |
| Radical Scavenger (Allyl TEMPO) | | | 0.68 | | |
| Radical Scavenger (Bis TEMPO) | | | | 0.72 | |
| Coagent/Peroxide Ratio (mol/mol) | 0.51 | 0.51 | 0.51 | 0.51 | 0.51 |
| Total | 100 | 100 | 100 | 100 | 100 |

Analyze CE2, CE9, IE2-2, IE9, and IE10 for curing behavior and methane production using the above-described Test Methods. The results are provided in Table 7, below.

TABLE 7

Properties of CE2, CE9, IE2-2, IE9, and IE10

| Properties | CE2 | IE2-2 | IE9 | IE10 | CE9 |
|---|---|---|---|---|---|
| ML, dN * m | 0.22 | 0.18 | 0.19 | 0.20 | 0.17 |
| MH, dN * m | 3.82 | 2.90 | 2.13 | 2.50 | 1.47 |
| MH-ML, dN * m | 3.60 | 2.72 | 1.94 | 2.30 | 1.30 |
| ts1 @ 180° C., min. | 1.08 | 2.27 | 2.63 | 2.07 | 5.11 |
| T90 @ 180° C., min. | 4.16 | 5.91 | 5.47 | 5.02 | 7.42 |
| ts1 @ 140° C., min. | 41.91 | 109.68 | 142.46 | 106.66 | |
| SI, min. | 6.33 | 61.26 | 72.93 | 48.65 | |
| Methane, ppm | 385 | 208 | 279 | 210 | 199 |
| ΔMethane, ppm | | −177 | −106 | −175 | |

The results from Table 7 show that various TEMPO derivatives (i.e., acrylate TEMPO, allyl TEMPO, and bis TEMPO) are suitable for use with the disclosed crosslinkable compositions. In particular, these TEMPO derivatives provide for crosslinkable compositions exhibiting decreased methane production, improved crosslink density, and improved scorch resistance.

CE2, CE10 and IE2-2, 2-3, 2-4 and IE11

Additional Examples are prepared according to the formulations provided in Table 8, below, and using the materials described above and the sample preparation methods below. Four Illustrative Samples (IE2-2, 2-3, 2-4 and IE11) and two Comparative Samples (CE2 and CE10) are prepared according to the formulations provided in Table 8 below by soaking DCP and coagents, with or without TEMPO derivatives, into LDPE1 or LDPE 2 pellets at 80° C. for 8 hours.

TABLE 8

Formulations of CE2, CE10 and IE2-2, 2-3, 2-4 and IE11

| Component | CE2 | IE2-2 | IE2-3 | IE2-4 | CE10 | IE11 |
|---|---|---|---|---|---|---|
| LDPE 1 | 98.6 | 97.88 | 98.12 | 98.22 | | |
| LDPE 2 | | | | | 98.55 | 98.37 |
| Organic Peroxide (DCP) | 0.95 | 0.95 | 0.95 | 0.85 | 0.50 | 0.50 |
| Coagent (TAIC) | 0.45 | 0.45 | 0.45 | 0.45 | 0.45 | 0.45 |
| Coagent (HATATA) | | | | | 0.50 | 0.50 |
| Radical Scavenger (Acrylate TEMPO) | | 0.72 | 0.48 | 0.48 | | 0.18 |
| Total | 100 | 100 | 100 | 100 | 100 | 100 |
| Coagent/DCP (mol/mol) | 0.51 | 0.51 | 0.51 | 0.57 | 1.71 | 1.71 |

Analyze CE2, CE10 and IE2-2, 2-3, 2-4 and IE11 for curing behavior and methane production using the above-described Test Methods. The results are provided in Table 9, below.

TABLE 9

Properties of CE2, CE10 and IE12-2, 2-3, 2-4 and IE11

| Properties | CE2 | IE2-2 | IE2-3 | IE2-4 | CE10 | IE11 |
|---|---|---|---|---|---|---|
| ML, dN * m | 0.22 | 0.18 | 0.18 | 0.19 | 0.19 | 0.17 |
| MH, dN * m | 3.82 | 2.90 | 3.54 | 3.02 | 3.21 | 2.90 |
| MH-ML, dN * m | 3.60 | 2.72 | 3.36 | 3.36 | 3.02 | 2.73 |
| ts1 @ 180° C., min. | 1.08 | 2.27 | 1.63 | 1.92 | 1.39 | 1.92 |
| T90 @ 180° C., min. | 4.16 | 5.91 | 5.06 | 5.34 | 4.67 | 5.43 |
| Methane, ppm | 385 | 208 | 281 | 216 | 194 | 160 |
| ΔMethane, ppm | | −177 | −104 | −169 | | −34 |

The results from Table 9 show that the IEs provide for crosslinkable compositions exhibiting decreased methane production, improved crosslink density, and improved scorch resistance.

Synthesis of diacrylamide TEMPO

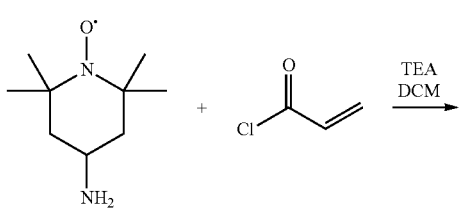

-continued

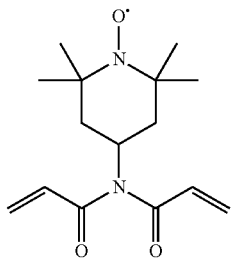

Acryloyl chloride (9.5 mL, 117 mmol) was added dropwise to a solution of 4-amino-2,2,6,6-tetramethylpiperidine 1-oxyl free radical (4 g, 23.4 mmol), and triethylamine (16.7 mL, 120 mmol) in DCM (100 mL), and the reaction mixture was stirred at room temperature for 16 h. The resulting solution was filtered, the solvent was removed under reduced pressure, and the resulting orange oil was purified by silica gel column chromatography using ethyl acetate/petroleum ether (1/1). An orange fraction (1.5 g, 30%) was collected at Rf around 0.3. LC-MS: calcd for $C_{15}H_{24}N_2O_3$ ($M^++H$) 280.179; found 281.1880. The structure was confirmed by mass spectrometry. The product contained a part of the monoacrylamide TEMPO that can not be separated by column chromatography.

Diacrylamide TEMPO was compounded with LDPE base resin in a Brabender mixer, at 120° C. for 4 minutes after feeding additives. After pelletizing at 120° C. by single screw extruder, curing coagents and DCP were soaked with the pellets at 80° C. for 8 hours. For acrylate TEMPO based formulation, acrylate TEMPO, DCP and crosslinking coagents were all soaked into LDPE at 80° C. for 8 hours.

TABLE 10

Formulation and properties of CE10, IE11, IE12, CE2, IE13 and IE14

| Material (wt %) | CE10 | IE11 | IE12 | CE2 | IE13 | IE14 |
|---|---|---|---|---|---|---|
| LDPE 1 | | | | 98.60 | 98.22 | 98.13 |
| LDPE2 | 98.55 | 98.37 | 98.34 | | | |
| DCP | 0.50 | 0.50 | 0.50 | 0.95 | 0.85 | 0.85 |
| TAIC | 0.45 | 0.45 | 0.45 | 0.45 | 0.45 | 0.45 |
| HATATA | 0.50 | 0.50 | 0.50 | | | |
| Acrylate TEMPO | | 0.18 | | | 0.48 | |
| Diacrylamide TEMPO | | | 0.21 | | | 0.57 |
| Total | 100 | 100 | 100 | 100 | 100 | 100 |
| MH, dN * m | 3.21 | 2.90 | 3.10 | 3.82 | 3.02 | 3.70 |
| ts1 @ 180° C., min. | 1.39 | 1.92 | 1.65 | 1.08 | 1.92 | 1.31 |
| T90 @ 180° C., min. | 4.67 | 5.43 | 4.86 | 4.16 | 5.34 | 4.50 |
| Methane, ppm | 194 | 160 | 156 | 385 | 216 | 246 |

Results and Discussion

The result from Table 10 shows a significant reduction in methane by comparing CE10 without methyl radical scavengers and IE11 with acrylate TEMPO and IE12 with diacryamide TEMPO. Similar trends from the comparison between CE2 without methyl radical scavenger and IE13 with acrylate TEMPO and IE14 with diacryl amide TEMPO.

Furthermore, compared with acrylate TEMPO, diacrylamide TEMPO provides a more efficient crosslinking with a substantial reduction in produced methane for a given level of crosslinking.

Synthesis of Monoacrylamide TEMPO

To a solution of 4-amino-TEMPO (5 g, 29.2 mmol) and triethylamine (5.9 mL, 43 mmol) in DCM (100 mL), acryloyl chloride (2.64 g, 29.2 mmol) was added dropwise. The mixture was stirred at room temperature for 16 h. The resulting solution was filtered before removing solvent under vacuum, product was purified by column chromatography (5.3 g, 80%, using 1/1 EtOAc/petroleum ether. Rf is about 0.2). LC-MS: calcd for $C_{12}H_{23}N_2O_2(M^++2H)$ 227.176; found 227.1764. (The oxy radical in TEMPO will be converted into hydroxylamine which will be further protonated in the acidic condition. That is why we observe $M^++2H$.)

Synthesis of triacryltriTEMPO

Monoacryl amide TEMPO (1.44 g, 6.4 mmol) was dissolved in THF (50 mL) and then NaH (400 mg, 50% dispersed in mineral oil, 8 mmol) was slowly added into the mixture at 0° C. under a nitrogen balloon. the mixture was stirred at 0° C. under nitrogen for 30 min, then Trimesoyl chloride (450 mg, 1.7 mmol) was added slowly. the mixture was then stirred for 20 h and then filtered by a filter paper, the filtrate was dried over $Na_2SO_4$, and the solvent was removed under reduced pressure, The crude product was then measured by MS. LC-MS: calcd for $C_{12}H_{23}N_2O_2(M^++3H)$ 834.4891; found 834.4863. (The oxyl radical in TEMPO will be converted into hydroxylamine which will be further protonated in the acidic condition. That is why we observe $M^++3H$.) The crude product was a mixture with a large quantity of monoacryl amide TEMPO starting material in it.

The samples in Table 11 were prepared according to the process below. LDPE base resins was mixed with or without monoacrylamide TEMPO and triacryltri TEMPO in a Brabender mixer, at 120° C. for 4 minutes after feeding additives. After pelletizing at 120° C. by single screw extruder, curing coagents and DCP were soaked with the pellets at 80° C. for 8 hours.

TABLE 11

Formulations and properties of CE11, IE15, IE16, CE12, IE17 and IE18

| Material (wt %) | CE11 | IE15 | IE16 | CE12 | IE17 | IE18 |
|---|---|---|---|---|---|---|
| LDPE 3 | 39.91 | 39.84 | 39.84 | 59.16 | 58.86 | 58.86 |
| LDPE 4 | 58.64 | 58.54 | 58.54 | 39.44 | 39.24 | 39.24 |
| DCP | 0.50 | 0.50 | 0.50 | 0.95 | 0.95 | 0.95 |
| TAIC | 0.45 | 0.45 | 0.45 | 0.45 | 0.45 | 0.45 |
| HATATA | 0.50 | 0.50 | 0.50 | | | |
| Monoacrylamide TEMPO | | 0.17 | | | 0.50 | |
| TriacryltriTEMPO | | | 0.17 | | | 0.50 |
| Total | 100 | 100 | 100 | 100 | 100 | 100 |
| MH, dN * m | 3.57 | 3.55 | 3.67 | 4.03 | 4.18 | 4.34 |
| ML, dN * m | 0.19 | 0.15 | 0.17 | 0.2 | 0.14 | 0.14 |
| ts1 @ 180° C., min. | 0.98 | 1.37 | 1.10 | 0.79 | 1.31 | 0.93 |
| T90 @ 180° C., min. | 3.89 | 4.52 | 4.03 | 3.66 | 4.60 | 3.89 |
| Methane, ppm | 231 | 190 | 218 | 473 | 332 | 457 |

From the above table we can see that compared to CE11 and CE12, the formulation with amide type of methyl radical scavengers shows both methane reduction and improved curing level.

The invention claimed is:

1. A crosslinkable polymeric composition consisting of:
an ethylene-based polymer selected from the group consisting of low-density polyethylene, linear-low-density polyethylene, very low-density polyethylene, and combinations of two or more thereof;
an organic peroxide;
a crosslinking coagent; and
a methyl-radical scavenger comprising at least one derivative of 2,2,6,6-tetramethyl-1-piperidinyloxyl,
wherein the ratio of crosslinking coagent to organic peroxide is less than 1.72:1 on a molar basis.

2. The crosslinkable polymeric composition according to claim 1, wherein the organic peroxide is selected from the group consisting of dicumyl peroxide, tert-butyl peroxybenzoate, di-tert-amyl peroxide, bis(alpha-t-butyl-peroxyisopropyl) benzene, isopropylcumyl t-butyl peroxide, t-butylcumylperoxide, di-t-butyl peroxide, 2,5-bis(t-butylperoxy)-2,5-dimethylhexane, 2,5-bis(t-butylperoxy)-2,5-dimethylhexyne-3, 1,1-bis(t-butylperoxy)-3,3,5-trimethylcyclohexane, isopropylcumyl cumylperoxide, butyl 4,4-di(tert-butylperoxy) valerate, di(isopropylcumyl) peroxide, and combinations of two or more thereof.

3. The crosslinkable polymeric composition according to claim 1, wherein the crosslinking coagent is selected from the group consisting of triallyl isocyanurate, triallyl cyanurate, triallyl trimellitate, trimethylolpropane triacrylate, N2,N2,N4,N4,N6,N6-hexaallyl-1,3,5-triazine-2,4,6-triamine and combinations of two or more thereof.

4. The crosslinkable polymeric composition of claim 3, wherein the crosslinking coagent comprises a blend of crosslinking coagents.

5. The crosslinkable polymeric composition of claim 3, wherein the at least one derivative of 2,2,6,6-tetramethyl-1-piperidinyloxyl is selected from the group consisting of 4-acryloxy-2,2,6,6-tetramethylpiperidine-N-oxyl, 4-allyloxy-2,2,6,6-tetramethylpiperidine-N-oxyl, and bis(2,2,6,6-tetramethyl-1-piperidinyloxy-4-yl) sebacate, and combinations of two or more thereof.

6. The crosslinkable polymeric composition of claim 3, wherein the at least one derivative of 2,2,6,6-tetramethyl-1-piperidinyloxyl is selected from the group consisting of N,N-bis(acryloyl-4-amino)-2,2,6,6-tetramethylpiperidine-1-oxyl; and N-acryloyl-4-amino-2,2,6,6-tetramethylpiperidine-1-oxyl and $N^1,N^3,N^5$-triacryloyl-$N^1,N^3,N^5$-tris(2,2,6,6-tetramethyl-1-($\lambda^1$-oxidanyl)piperidin-4-yl)benzene-1,3,5-tricarboxamide, and combinations of two or more thereof.

7. The crosslinkable polymeric composition of claim 6, further comprising one or more of scorch retardants, antioxidants, processing aids, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, flame retardants, and metal deactivators.

8. The crosslinkable polymeric composition of claim 1, wherein the ethylene-based polymer is present in an amount ranging from 90 to 99.9 weight percent, based on the entire crosslinkable polymeric composition weight, wherein the organic peroxide is present in an amount of less than 3 weight percent, based on the entire crosslinkable polymeric composition weight, wherein the crosslinking coagent is present in an amount ranging from 0.2 to 1 weight percent, based on the entire crosslinkable polymeric composition weight, wherein the methyl-radical scavenger is present in an amount ranging from 0.05 to 1 weight percent, based on the entire crosslinkable polymeric composition weight.

9. A crosslinked polymeric article prepared from the crosslinkable polymeric composition according to claim 1.

10. A cable core, comprising:
a conductor;
a first polymeric semiconductive layer at least partially surrounding the conductor;
an insulation layer at least partially surrounding the first polymeric semiconductive layer and comprising the crosslinked polymeric article of claim 9; and
a second semiconductive layer at least partially surrounding the insulation layer.

* * * * *